United States Patent
Rouby et al.

(10) Patent No.: US 11,999,121 B2
(45) Date of Patent: Jun. 4, 2024

(54) METHOD FOR MANUFACTURING A TIRE WITH REINFORCED TREAD BLOCKS

(71) Applicant: COMPAGNIE GENERALE DES ETABLISSEMENTS MICHELIN, Clermont-Ferrand (FR)

(72) Inventors: Mickael Rouby, Clermont-Ferrand (FR); Patrice Monnereau, Clermont-Ferrand (FR); Christophe Bessac, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 542 days.

(21) Appl. No.: 17/058,904

(22) PCT Filed: May 20, 2019

(86) PCT No.: PCT/EP2019/062961
§ 371 (c)(1),
(2) Date: Nov. 25, 2020

(87) PCT Pub. No.: WO2019/228840
PCT Pub. Date: Dec. 5, 2019

(65) Prior Publication Data
US 2021/0197511 A1    Jul. 1, 2021

(30) Foreign Application Priority Data
May 29, 2018    (FR) ...................................... 1854594

(51) Int. Cl.
*B29D 30/60*    (2006.01)
*B29D 30/14*    (2006.01)
(Continued)

(52) U.S. Cl.
CPC ............. *B29D 30/60* (2013.01); *B29D 30/14* (2013.01); *B29D 30/66* (2013.01); *B60C 11/005* (2013.01); *B29D 2030/665* (2013.01)

(58) Field of Classification Search
CPC ................ B29D 30/14; B29D 30/1621; B29D 30/1628; B29D 30/3021; B29D 30/3028;
(Continued)

(56) References Cited

U.S. PATENT DOCUMENTS

| | | | |
|---|---|---|---|
| 1,948,311 A | 2/1934 | Orr | |
| 2,207,098 A | 7/1940 | Maynard | |

(Continued)

FOREIGN PATENT DOCUMENTS

| | | |
|---|---|---|
| AU | 2467971 | 7/1972 |
| DE | 1289306 B | 2/1969 |

(Continued)

OTHER PUBLICATIONS

Tanigawa T, JP-2011037415-A, updated machine translation. (Year: 2011).*

(Continued)

*Primary Examiner* — Sedef E Paquette
(74) *Attorney, Agent, or Firm* — VENABLE LLP

(57) ABSTRACT

A method for manufacturing a tire (1) comprises a step of positioning a reinforcing ply (9) in a rubber material having grooves (6*a*) such that the reinforcing ply (9) extends through the grooves (6*a*), and of crosslinking the tire (1) based on uncured rubber material while hot moulding the latter, with the reinforcing ply (9) being pushed against the bottom of the grooves (6*a*).

7 Claims, 2 Drawing Sheets

(51) Int. Cl.
*B29D 30/66* (2006.01)
*B60C 11/00* (2006.01)

(58) Field of Classification Search
CPC ........ B29D 30/42; B29D 30/52; B29D 30/58; B29D 30/60; B29D 30/66; B29D 30/68; B29D 2030/0601; B29D 2030/665; B29D 2030/685; B60C 11/005; B60C 11/14; B60C 11/18; B60C 9/18
USPC ........ 156/110.1, 114, 117, 123, 128.1, 128.6
See application file for complete search history.

(56) References Cited

U.S. PATENT DOCUMENTS

| | | | |
|---|---|---|---|
| 2,232,487 | A | 2/1941 | Smith |
| 2,710,042 | A | 6/1955 | Gates, Jr. |
| 3,565,716 | A | 2/1971 | Felker |
| 5,298,216 | A | 3/1994 | Kim et al. |
| 10,744,733 | B2 | 8/2020 | Sandstrom et al. |
| 10,850,464 | B1 | 12/2020 | Sandstrom et al. |
| 2013/0048171 | A1 | 2/2013 | Sandstrom et al. |
| 2014/0138874 | A1 | 5/2014 | Mayni |
| 2015/0007926 | A1 | 1/2015 | Sandstrom et al. |
| 2016/0318346 | A1 | 11/2016 | Clemmer et al. |
| 2020/0368984 | A1 | 11/2020 | Sandstrom et al. |
| 2021/0213696 | A1 | 7/2021 | Rouby et al. |

FOREIGN PATENT DOCUMENTS

| | | | | |
|---|---|---|---|---|
| DE | 19542996 | A1 | 5/1997 | |
| DE | 102006028616 | A1 | 12/2007 | |
| DE | 102012214485 | A1 | 2/2013 | |
| EP | 257269 | A * | 3/1988 | ............ B60C 11/00 |
| EP | 1870259 | A1 | 12/2007 | |
| JP | 2011-37415 | A | 2/2011 | |
| JP | 2013-237283 | A | 11/2013 | |
| WO | 2015/108744 | A1 | 7/2015 | |
| WO | 2016/184692 | A1 | 11/2016 | |

OTHER PUBLICATIONS

Bessac C, WO-2016184692-A1, machine translation, 2016. (Year: 2016).*
Kronthaler P, EP-257269-A, machine translation. (Year: 1988).*
International Search Report dated Aug. 21, 2019, in corresponding PCT/EP2019/062961 (4 pages).

* cited by examiner

METHOD FOR MANUFACTURING A TIRE WITH REINFORCED TREAD BLOCKS

TECHNICAL FIELD OF THE INVENTION

The present invention relates to a method for manufacturing a tyre having reinforced tread pattern blocks making it possible to limit the rocking of the tread pattern blocks.

TECHNICAL BACKGROUND OF THE INVENTION

The incorporation of a reinforcer during the production of a tread in a centralized manufacturing process is not economically conceivable, since, during the assembly of these composite semi-finished products, scrap that is produced is not recyclable, meaning that it results in losses of material that cannot be reused.

The application WO 2016/184692 has already proposed a mould for vulcanizing a tyre that makes it possible, during the vulcanization step, to embed a textile reinforcer in the tread in an arch shape brought about by complementary shapes of the mould. Embedding is made possible by the permeability of the textile reinforcer with respect to the rubber used during the vulcanization step. However, these complementary shapes make the associated mould complex and impose a particular geometry on the tread pattern of the tread.

SUMMARY OF THE INVENTION

The aim of the invention is to propose a novel manufacturing method that is simpler and more economical to implement in order to obtain a tyre having reinforced tread pattern blocks.

To this end, the invention relates to a method for manufacturing a tyre, having the following steps of:

Positioning a reinforcing ply in a rubber material having grooves such that the reinforcing ply extends through the grooves;

Crosslinking the tyre based on uncured rubber material while hot moulding the latter, with the reinforcing ply being pushed against the bottom of the grooves.

The manufacturing method according to the invention makes it possible to obtain a tyre in which the tread pattern blocks of the tread are stiffened so as to limit their deformation, making it possible to improve the behaviour and the wearing of the tyre.

Specifically, in an unexpected manner thanks to the method according to the invention, the reinforcing ply takes on an arch shape in the tread pattern blocks without a dedicated shape of the mould or of the stiffening layer, thereby allowing stiffening substantially equivalent to that described in the document WO 2016/184692 without using the complex mould or the imposed tread pattern geometry thereof. It will thus be understood that the tyre obtained has characteristics similar to those described in the document WO 2016/184692 with the aid of a simpler and more economical method. In addition, any scrap generated during the manufacturing method is entirely recyclable.

The invention may also have one or more of the following optional features, on their own or in combination.

According to a first possibility, the manufacturing method has the following steps of:

Manufacturing a carcass based on uncured rubber material;

Mounting on the carcass a green form of tread based on uncured rubber material comprising the rubber material having the grooves;

Mounting on the green form of tread a stiffening layer having uncured rubber material and the reinforcing ply in order to form a tyre based on uncured rubber material, the reinforcing ply being interposed between the rubber material of the green form of tread and the rubber material of the stiffening layer.

According to this first possibility, the grooves are formed in the green form of the tread. It will thus be understood that the reinforcing ply can thus be mounted directly by covering grooves of the green form of the tread, thereby making it possible to simplify the manufacture of the stiffening layer.

Moreover, the principle of positioning the reinforcing ply before completing the tread makes it possible to have a controlled depth in the thickness of the tread. As a result, the reinforcing ply does not have to exhibit a particular permeability with respect to the rubber during the vulcanization step.

According to a first embodiment, the step of mounting the stiffening layer has the following phases of:

Manufacturing the uncured rubber material and the reinforcing ply;

Mounting the reinforcing ply on the green form of tread;

Mounting the uncured rubber material on at least a part of the reinforcing ply.

This first embodiment allows material by material mounting on the green form of the tread. This first embodiment is the simplest and most economical to implement.

According to a second embodiment, the step of mounting the stiffening layer has the following phases of:

Manufacturing the uncured rubber material and the reinforcing ply;

Assembling the uncured rubber material on at least a part of the reinforcing ply so as to form a composite stiffening layer;

Mounting the composite stiffening layer on the green form of tread.

This second embodiment allows the separate preparation of the stiffening layer in order then to be mounted on the green form of tread.

According to a third embodiment, the step of mounting the stiffening layer has the following phases of:

Manufacturing the uncured rubber material and the reinforcing ply;

Mounting the reinforcing ply on the green form of tread;

Mounting the uncured rubber material on at least a part of the reinforcing ply by successive winding of strips.

This third embodiment allows the use of a method of the "strip winding" type, which makes it possible, by successive winding of strips, to very precisely form a structure comprising uncured rubber and/or filamentary elements in successive stacks.

According to a second possibility, uncured rubber material may also be provided between the ply and the green form of the tread. It will thus be understood that the grooves are formed not in the green form of the tread but in the lower part of the stiffening layer. It will thus be understood that the effects and advantages of the invention are obtained in a manner equivalent to the first possibility. Of course, the three embodiments, variants and combination of variants could be adapted to this second possibility.

Regardless of the embodiment or the possibility, the stiffening layer may be mounted such that it does not have uncured rubber material vertically in line with the grooves of the green form of the tread, in order to maximize the pushing of the stiffening layer by the mould to the bottom of the grooves.

Regardless of the embodiment or the possibility, the reinforcing ply may have polymer-based fibres in order to stiffen the future tread pattern blocks of the tyre while retaining sufficient flexibility to implement the pushing of the stiffening layer during the hot moulding step.

According to a first variant, the step of mounting the green form of tread on the carcass has the following phases of:
Manufacturing at least one uncured rubber material;
Mounting the uncured rubber material on the carcass so as to form the green form of tread.

This first variant makes it possible to use conventional manufacturing means to form the green form of the tread. It will be understood that the green form will preferably have a thickness that is less than normal in order to form, with the stiffening layer, the final thickness of the tread before the hot moulding step.

According to a second variant, the step of mounting the green form of tread on the carcass has the following phases of:
Manufacturing at least one uncured rubber material;
Mounting the uncured rubber material on the carcass so as to form the green form of tread by successive winding of strips.

This second embodiment makes it possible to use the use of a method of the "strip winding" type, which makes it possible, by successive winding of strips, to very precisely form a structure comprising uncured rubber and/or filamentary elements in successive stacks. It will be understood that the green form will preferably have a thickness that is less than normal in order to form, with the stiffening layer, the final thickness of the tread before the hot moulding step.

It will also be understood that the entire uncured tread, before the step of crosslinking and moulding the uncured tyre, may be obtained continuously with the aid of the method of the "strip winding" type, that is to say both the step of mounting the green form of tread and the step of mounting the stiffening layer.

BRIEF DESCRIPTION OF THE DRAWINGS

Further particular features and advantages of the invention will become clearly apparent from the following description thereof, which is given by way of entirely non-limiting indication, with reference to the appended drawings, in which.

DETAILED DESCRIPTION OF AT LEAST ONE EMBODIMENT OF THE INVENTION

In the various figures, elements that are identical or similar bear the same references, possibly supplemented by a suffix. The description of their structure and of their function is therefore not systematically repeated.

Figure 2:
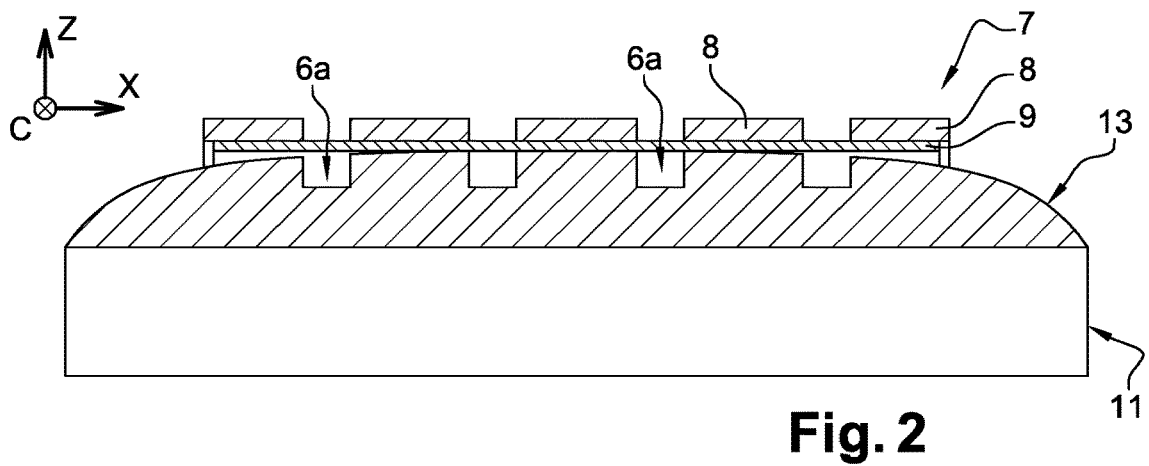
FIG. 2 is a schematic view in cross section of the step of mounting a stiffening layer according to the first embodiment of the method according to the invention.
Figure 5:
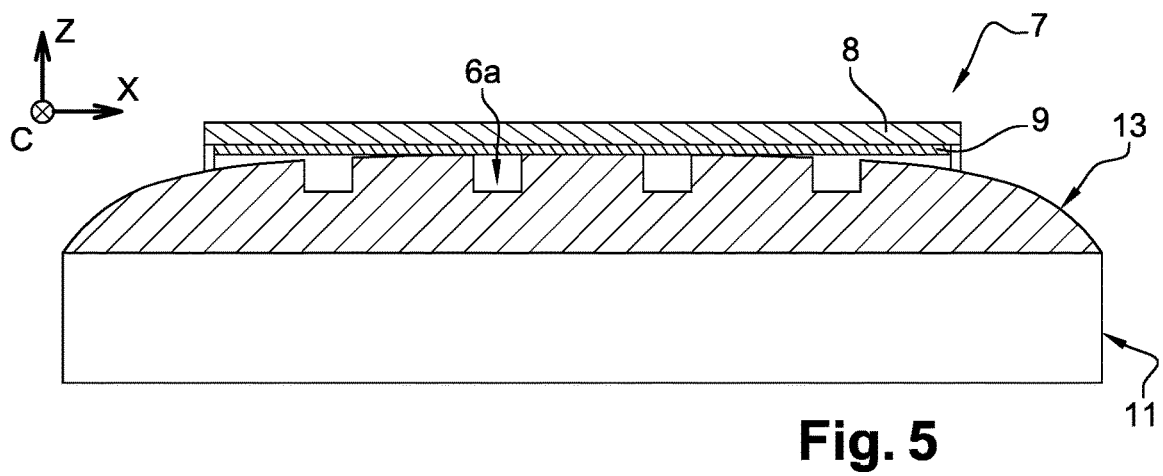
FIG. 5 is a schematic view in cross section of a step of mounting a stiffening layer according to a second embodiment of the method according to the invention.
Figure 6:
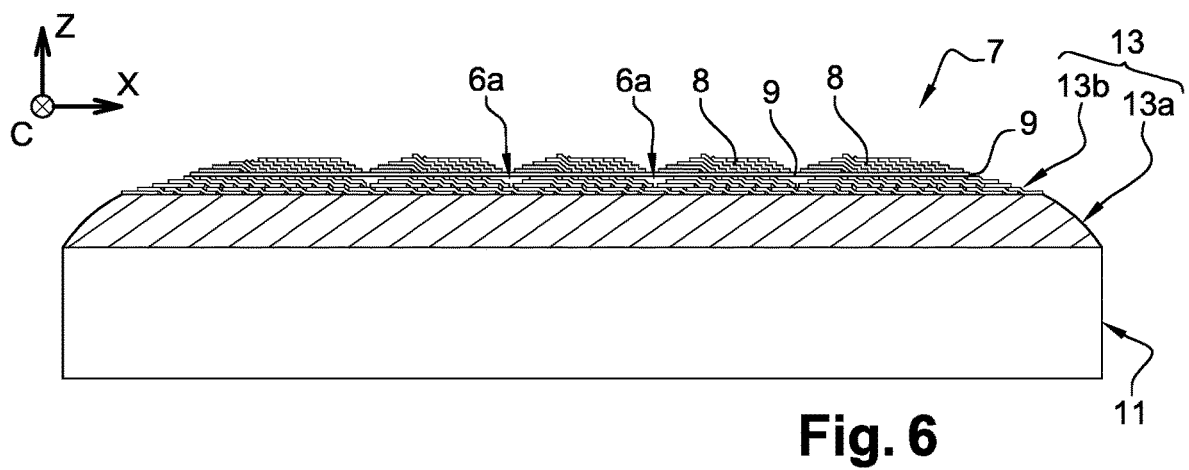
FIG. 6 is a schematic view in cross section of a step of mounting a stiffening layer according to a third embodiment of the method according to the invention.

In FIGS. 2, 5 and 6, mutually orthogonal axes C, X and Z, which correspond to the normal circumferential (C), axial (X) and radial (Z) orientations of a tyre 1, are shown. A "tyre" means all types of resilient tread, which are subjected to an internal pressure.

A "rubber material", or "rubber", means a material based on a crosslinkable composition comprising an elastomer, for example a diene elastomer. Such a material is referred to as "uncured rubber material" or "uncured rubber" before crosslinking.

A "carcass" means any part that does not belong to the tread.

A "tread" means a quantity of rubber material delimited by lateral surfaces and by two main surfaces, one of which, referred to as the tread surface, is intended to come into contact with a road surface when the tyre is being driven on.

The aim of the invention is to propose a novel manufacturing method that is simpler and more economical to implement in order to obtain a tyre having reinforced tread pattern blocks.

The invention is applicable to any type of tyre, in particular those intended to be fitted on motor vehicles of the passenger or SUV ("Sport Utility Vehicle") type, two-wheel vehicles (in particular motorcycles), aircraft, industrial vehicles selected from vans, heavy transport vehicles, i.e. light rail vehicles, buses, heavy road transport vehicles (lorries, tractors and trailers), and off-road vehicles such as agricultural or construction plant vehicles, or other transport or handling vehicles. The invention is also applicable to non-motorized vehicles, in particular a trailer, a semi-trailer or a caravan.

Figure 4:
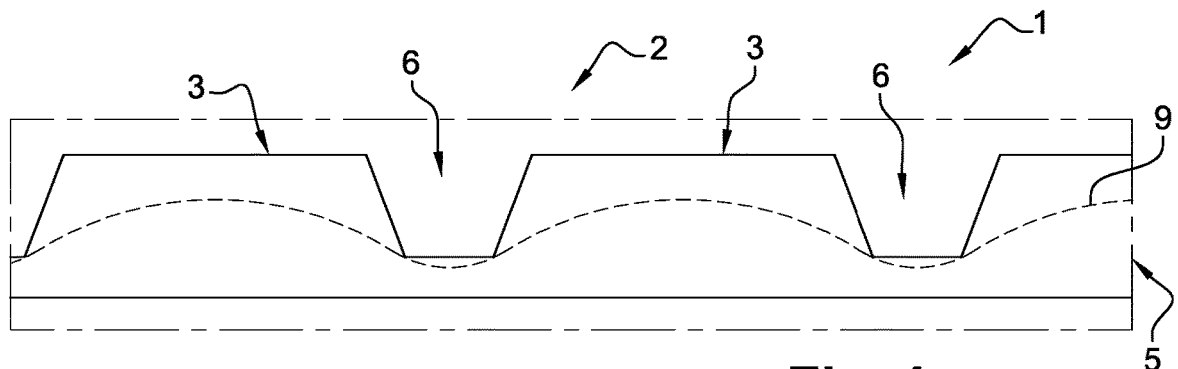
FIG. 4 is a schematic view in cross section of a tread of a tyre obtained according to the method of the invention.

The manufacturing method according to the invention makes it possible to obtain a tyre 1, in which the tread pattern 2 blocks 3 of the tread 5 are stiffened, as illustrated in FIG. 4. The stiffening is obtained by a substantially arch-shaped reinforcing ply 9 in the tread pattern 2 blocks 3 for limiting the deformation thereof in order to improve the behaviour and wearing of the tyre 1. More specifically, in the example in FIG. 4, it is possible to see that, in the partial meridian section of the tread 5 (section plane oriented on the axes X-Z), the reinforcing ply 9 forms a continuous line that extends under the bottoms of the grooves 6 of the tread pattern 2 of the tread 5 and impresses a convex curve in the thickness of each block 3 between each groove 6 bottom.

In order to obtain this tyre 1, the invention relates to a method for manufacturing a tyre 1, having a step of positioning a reinforcing ply 9 in a rubber material having grooves 6a such that the reinforcing ply 9 extends through the grooves 6a, and then a final step intended for crosslinking the tyre 1 based on uncured rubber material while hot moulding the latter, with the reinforcing ply 9 being pushed against the bottom of the grooves 6a.

In an unexpected manner thanks to the method according to the invention, the reinforcing ply 9 takes on an arch shape in the tread pattern 2 blocks 3 without a dedicated shape of the mould or of the stiffening layer 7, thereby allowing stiffening substantially equivalent to that described in the document WO 2016/184692 without using the complex mould or the imposed tread pattern geometry thereof. It will thus be understood that the tyre obtained has characteristics similar to those described in the document WO 2016/184692 with the aid of a simpler and more economical method. In addition, any scrap generated during the manufacturing method is entirely recyclable.

According to a first possibility of the invention, the grooves 6*a* are formed in a green form 13 of the tread 5. A first embodiment of the first possibility according to the invention is illustrated in FIGS. 1 to 4. According to the first embodiment, the method for manufacturing a tyre 1 has a first step intended for manufacturing a carcass 11 based on uncured rubber material as obtained, for example, by way of a conventional manufacturing method. By way of entirely non-limiting example, the step of manufacturing the carcass 11 can have the phases of manufacturing the uncured rubber materials, a carcass ply (not visible), two bead wires (not visible), an air-impermeable inner liner (not visible) and working crown plies (not visible), and then of producing the carcass 11 from the uncured rubber materials, the carcass ply, the two bead wires, the air-impermeable inner liner and the working crown plies.

The method continues with a second step intended for mounting on the carcass 11 a green form 13 of tread 5 based on uncured rubber material having grooves 6*a* in order to form a green form of tyre 1 based on uncured rubber material.

According to a first variant, the step of mounting on the carcass 11 the green form 13 of tread 5 manufacturing the carcass may have a first phase intended for manufacturing at least one uncured rubber material and then a second phase intended for mounting the uncured rubber material on the carcass 11 so as to form the green form 13 of tread 5 having grooves 6*a*.

This first variant makes it possible to use conventional manufacturing means to form the green form 13 of the tread 5. It will be understood that the green form 13 will preferably have a thickness that is less than normal in order to form, with the stiffening layer 7, the final thickness of the tread 5 before the hot moulding step.

According to a second variant, the step of mounting on the carcass 11 the green form 13 of tread 5 has a first phase intended for manufacturing at least one uncured rubber material and then a second phase intended for mounting the uncured rubber material on the carcass 11 so as to form the green form 13 of tread 5 having grooves 6*a* by successive winding of strips.

This second variant allows the use of a method of the "strip winding" type, which makes it possible, by successive winding of strips, to very precisely form a structure comprising uncured rubber and/or filamentary elements in successive stacks. It will be understood that the green form 13 will preferably have a thickness that is less than normal in order to form, with the stiffening layer 7, the final thickness of the tread before the hot moulding step.

Of course, it is conceivable for the first and second variants to be able to be combined so as to form a part 13*a* of the green form 13 with a conventional phase and then to form another part 13*b* of the green form 13, for example the one having the grooves 6*a*, with a phase of the "strip winding" type, as can be seen in FIG. 6.

The method according to the first embodiment of the invention then has a third step intended for mounting a stiffening layer 7 based on uncured rubber material 8 and a reinforcing ply 9 on the green form 13 of tyre 1 so as to form a tyre 1 based on uncured rubber material.

Advantageously according to the invention, the principle of positioning the reinforcing ply 9 before completing the tread 5 makes it possible to have a controlled depth in the thickness of the tread 5. As a result, the reinforcing ply 9 does not have to exhibit a particular permeability with respect to the rubber during the final hot moulding step.

The step of mounting the stiffening layer 7 according to the first embodiment may have a first phase intended for manufacturing the uncured rubber material 8 and the reinforcing ply 9. The uncured rubber material 8 may advantageously be a rubber conventionally used for the tread 5. Similarly, the reinforcing ply 9 may have normal polymer-based fibres affording sufficient flexibility so as to implement the hot moulding step.

Figure 1:
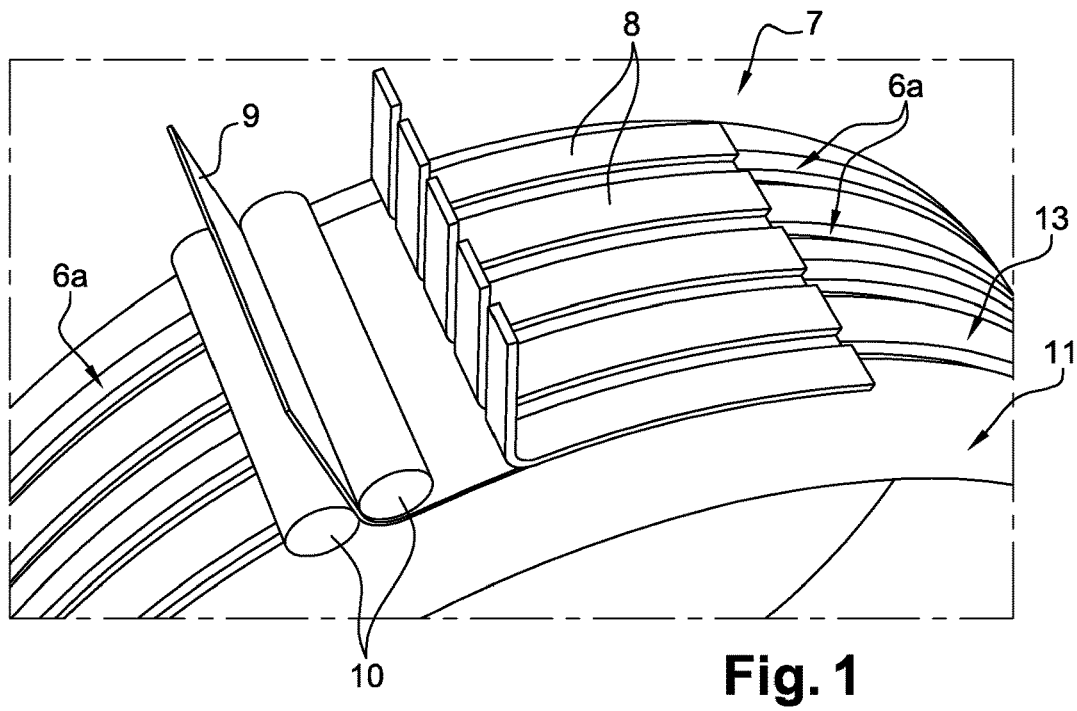
FIG. 1 is a perspective view of a step of mounting a stiffening layer according to a first embodiment of the method according to the invention.

In the example in FIGS. 1 and 2, it is possible to see that a second phase intended for mounting the reinforcing ply 9 on the green form 13 of tread 5 with the aid of rollers 10 that make it possible to lay the reinforcing ply 9 flat. It is also possible to see a third phase intended for mounting the uncured rubber material 8 on at least a part of the reinforcing ply 9.

In the particular example in FIGS. 1 and 2, it is possible to see that the stiffening layer 7 is mounted such that it does not have uncured rubber material 8 vertically in line with the grooves 6*a* of the green form 13 of the tread 5. This configuration is preferred in order to maximize the pushing of the stiffening layer 7 by the mould 15 to the bottom of the grooves 6*a* during the final hot moulding step.

This first embodiment thus allows material by material mounting of the stiffening layer 7 on the green form 13 of the tread 5. This first embodiment is the simplest and most economical to implement.

Finally, the method according to the first embodiment of the invention ends with the final step intended for hot moulding the tyre based on uncured rubber material. It will be understood that this conventional step in the methods for manufacturing a tyre 1 is intended for carrying out the vulcanization of the substantially plastic uncured rubber materials into a homogeneous whole made of elastic material.

Figure 3:
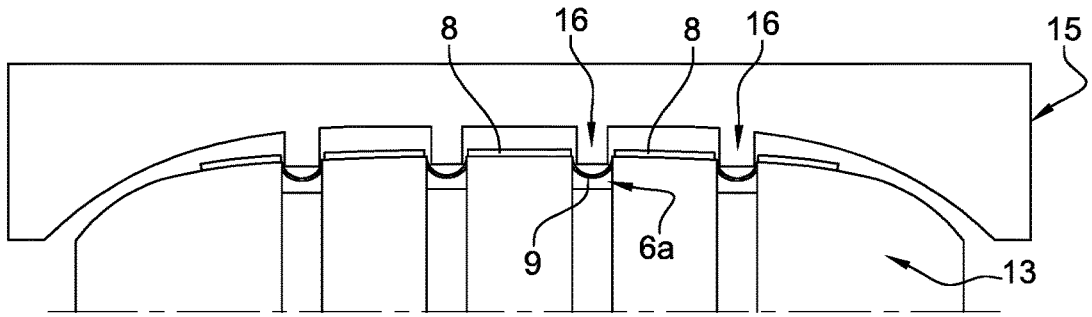
FIG. 3 is a schematic view of a step of crosslinking and hot moulding a tyre in the method according to the invention.

According to the invention, as can be seen in FIG. 3, the hot moulding step has a first phase of closing the mould 15 against the tyre 1 based on uncured rubber material. During this first conventional phase, the moving of the mould 15 towards in particular the tread 5 makes it possible, with the aid of the negative impressions 16 of the future grooves 6 of the tread pattern 2, to push the stiffening layer 7 against the bottom of the grooves 6*a* of the green form 13 of the tread 5. The step continues with a second, vulcanization phase for making the tyre 1 elastic and modelling the external shape thereof, in particular the tread pattern 2 of the tread 5 and the decoration of the outer sidewalls (not shown).

Thus, in the manufacturing method according to the first embodiment of the first possibility, the grooves 6*a* are formed in the green form 13 of the tread 5. It will thus be understood that the reinforcing ply 9 can thus be mounted directly by covering grooves 6*a* of the green form 13 of the tread 5, thereby making it possible to simplify the manufacture of the stiffening layer 7.

In addition, in an unexpected manner thanks to the method according to the invention, the reinforcing ply 9 takes on an arch shape, as can be seen in FIG. 4, in the tread pattern 2 blocks 3 without a dedicated shape of the mould 15 or of the stiffening layer 7, thereby allowing stiffening substantially equivalent to that described in the document WO 2016/184692 without using the complex mould or the imposed tread pattern geometry thereof. In addition, any scrap generated during the manufacturing method is entirely recyclable.

According to a second embodiment of the invention, the method for manufacturing a tyre 1 has a first step identical to that of the first embodiment with the same effects and advantages in order to manufacture the carcass 11. The method continues with a second step identical to that of the first embodiment with the same variants, combination of variants, effects and advantages in order to form the green form of tyre 1.

The method according to the second embodiment of the invention then has a third step intended for mounting a stiffening layer 7 based on uncured rubber material 8 and a reinforcing ply 9 on the green form 13 of tyre 1 so as to form a tyre 1 based on uncured rubber material.

Advantageously according to the invention, the principle of positioning the stiffening layer 7 before completing the tread 5 makes it possible to have a controlled depth in the thickness of the tread 5. As a result, the reinforcing ply 9 of the stiffening layer 7 does not have to exhibit a particular permeability with respect to the rubber during the final hot moulding step.

The step of mounting the stiffening layer 7 according to the second embodiment may have a first phase intended for manufacturing the uncured rubber material 8 and the reinforcing ply 9. The uncured rubber material 8 may advantageously be a rubber conventionally used for the tread 5. Similarly, the reinforcing ply 9 may have normal polymer-based fibres affording sufficient flexibility so as to implement the hot moulding step.

The third step continues with a second phase intended for assembling the uncured rubber material 8 on at least a part of the reinforcing ply 9 so as to form a composite stiffening layer 7, as can be seen in FIG. 5. It is also possible to see a third phase intended for mounting the composite stiffening layer 7 on the green form 13 of tread 5.

In the particular example in FIG. 5, it is possible to see that the uncured rubber material 8 entirely covers the reinforcing ply 9. This second embodiment allows the separate preparation of the stiffening layer 7 in order then to be mounted on the green form 13 of tread 5.

Finally, the method according to the second embodiment of the invention ends with the final step, which is identical to that of the first embodiment with the same effects and advantages in order in particular to carry out the vulcanization of the substantially plastic uncured rubber materials into a homogeneous whole made of elastic material.

According to a third embodiment of the invention, the method for manufacturing a tyre 1 has a first step identical to that of the first and second embodiments with the same effects and advantages in order to manufacture the carcass 11. The method continues with a second step identical to that of the first and second embodiments with the same variants, combination of variants, effects and advantages in order to form the green form 13 of tyre 1.

The method according to the third embodiment of the invention then has a third step intended for mounting a stiffening layer 7 based on uncured rubber material 8 and a reinforcing ply 9 on the green form 13 of tyre 1 so as to form a tyre 1 based on uncured rubber material.

Advantageously according to the invention, the principle of positioning the reinforcing ply 9 before completing the tread 5 makes it possible to have a controlled depth in the thickness of the tread 5. As a result, the reinforcing ply 9 does not have to exhibit a particular permeability with respect to the rubber during the final hot moulding step.

The step of mounting the stiffening layer 7 according to the third embodiment may have a first phase intended for manufacturing the uncured rubber material 8 and the reinforcing ply 9. The uncured rubber material 8 may advantageously be a rubber conventionally used for the tread 5. Similarly, the reinforcing ply 9 may have normal polymer-based fibres affording sufficient flexibility so as to implement the hot moulding step.

The third step continues with a second phase intended for mounting the reinforcing ply 9 on the green form 13 of tread 5, as can be seen in FIG. 6. It is also possible to see a third phase intended for mounting the uncured rubber material 8 on at least a part of the reinforcing ply 9 by successive winding of strips.

In the particular example in FIG. 6, it is possible to see that the uncured rubber material 8 covers the reinforcing ply 9 more than in the first embodiment without entirely covering it as in the second embodiment. It will thus be understood that the amount of coverage of the uncured rubber material 8 is not an essential feature of the invention, and also that it is not dependent on the type of mounting of the stiffening layer 7.

This third embodiment allows the use of a method of the "strip winding" type, which makes it possible, by successive winding of strips, to very precisely form a structure comprising uncured rubber and/or filamentary elements in successive stacks, as can be seen best in FIG. 6.

Finally, the method according to the third embodiment of the invention ends with the final step, which is identical to that of the first and second embodiments with the same effects and advantages in order in particular to carry out the vulcanization of the substantially plastic uncured rubber materials into a homogeneous whole made of elastic material.

As explained above, it is conceivable for the first and second variants of the second step of the method according to the invention to be able to be combined so as to form a part 13a of the green form 13 with a conventional phase and then to form another part 13b of the green form 13, for example the one having the grooves 6a, with a phase of the "strip winding" type, as can be seen in FIG. 6. It will thus be understood that, according to the third embodiment all or part of the uncured tread 5 may be obtained continuously with the aid of the method of the "strip winding" type, that is to say both the step of mounting the green form 13 of tread 5 and the step of mounting the stiffening layer 7.

The invention is not limited to the embodiments and variants presented and other embodiments and variants will be clearly apparent to a person skilled in the art. It is in particular possible for uncured rubber material 8 to also be provided between the ply 9 and the green form 13 of the tread 5. It will thus be understood that the grooves 6a are formed not in the green form 13 of the tread 5 but in the lower part of the stiffening layer 7.

By way of entirely non-limiting example, the method for manufacturing a tyre could thus have, according to another possibility, the following steps of:

Manufacturing a carcass 11 based on uncured rubber material;

Mounting on the carcass 11 a green form 13 of tread 5 based on uncured rubber material;

Mounting a stiffening layer 7 based on uncured rubber material 8 and a reinforcing ply 9 on the green form 13 of tread 5, a layer of uncured rubber material 8 with a variable thickness forming grooves 6a being mounted between the reinforcing ply 9 and the green form 13 of tread 5 in order to form a tyre 1 based on uncured rubber material;

Hot moulding the tyre 1 based on uncured rubber material with the reinforcing ply 9 of the stiffening layer 7 being pushed against the bottom of the grooves 6a in order to make the tyre 1 elastic and model the external shape thereof.

It will thus be understood that the effects and advantages of the invention will be obtained in an equivalent manner with this other possibility.

Of course, the three embodiments, variants and combination of variants could be adapted to this other possibility. Thus, by way of example, the step of mounting the stiffening layer 7 could, in a first suitable embodiment, have the following phases of:

Manufacturing the uncured rubber material 8 and the reinforcing ply 9;

Mounting the layer of uncured rubber material 8 with the grooves 6a on a first face of the reinforcing ply 9;

Mounting the reinforcing ply 9 on the green form 13 of tread 5 such that the grooves 6a are mounted between the reinforcing ply 9 and the green form 13 of tread 5;

Mounting uncured rubber material 8 on at least a part of a second face of the reinforcing ply 7.

In addition, the step of mounting the stiffening layer 7 could, in a second suitable embodiment, have the following phases of:

Manufacturing the uncured rubber material 8 and the reinforcing ply 9;

Assembling the layer of uncured rubber material 8 with the grooves 6a on a first face of the reinforcing ply 9 and on at least a part of a second face of the reinforcing ply 9 so as to form a composite stiffening layer 7;

Mounting the composite stiffening layer 7 on the green form 13 of tread 5 such that the grooves 6a are mounted between the reinforcing ply 9 and the green form 13 of tread 5.

Finally, the step of mounting the stiffening layer 7 could, in a third suitable embodiment, have the following phases of:

Manufacturing the uncured rubber material 8 and the reinforcing ply 9;

Mounting the layer of uncured rubber material 8 with the grooves 6a on a first face of the reinforcing ply 9 by successive winding of strips;

Mounting the reinforcing ply 9 on the green form 13 of tread 5 such that the grooves 6a are mounted between the reinforcing ply 9 and the green form 13 of tread 5;

Mounting uncured rubber material 8 on at least a part of a second face of the reinforcing ply 9 by successive winding of strips.

The invention claimed is:

1. A method for manufacturing a tire comprising:
positioning a reinforcing ply in a rubber material having grooves such that the reinforcing ply extends through the grooves;
crosslinking the tire based on uncured rubber material by hot molding the uncured rubber material, with the reinforcing ply being pushed against the bottom of the grooves;
manufacturing a carcass based on uncured rubber material;
mounting on the carcass a green form of tread based on uncured rubber material comprising the rubber material having the grooves; and
mounting on the green form of tread a stiffening layer having uncured rubber material and the reinforcing ply, the reinforcing ply being interposed between the rubber material of the green form of tread and the rubber material of the stiffening layer,
wherein the stiffening layer is mounted such that it does not have uncured rubber material vertically in line with the grooves.

2. The method according to claim 1, wherein the step of mounting the stiffening layer comprises:
manufacturing the uncured rubber material of the stiffening layer and the reinforcing ply;
mounting the reinforcing ply on the green form of tread; and
mounting the uncured rubber material of the stiffening layer on at least a part of the reinforcing ply.

3. The method according to claim 1, wherein the step of mounting the stiffening layer comprises:
manufacturing the uncured rubber material of the stiffening layer and the reinforcing ply;
assembling the uncured rubber material of the stiffening layer on at least a part of the reinforcing ply so as to form a composite stiffening layer; and
mounting the composite stiffening layer on the green form of tread.

4. The method according to claim 1, wherein the step of mounting the stiffening layer comprises:
manufacturing the uncured rubber material of the stiffening layer and the reinforcing ply;
mounting the reinforcing ply on the green form of tread; and
mounting the uncured rubber material of the stiffening layer on at least a part of the reinforcing ply by successive winding of strips.

5. The method according to claim 1, wherein the reinforcing ply has polymer-based fibers.

6. The method according to claim 1, wherein the step of mounting the green form of tread on the carcass comprises:
manufacturing at least one uncured rubber material; and
mounting the at least one uncured rubber material on the carcass so as to form the green form of tread.

7. The method according to claim 1, wherein the step of mounting the green form of tread on the carcass comprises:
manufacturing at least one uncured rubber material; and
mounting the at least one uncured rubber material on the carcass so as to form the green form of tread by successive winding of strips.

* * * * *